United States Patent [19]

Tanaka

[11] 4,284,331

[45] Aug. 18, 1981

[54] PHOTOGRAPHIC OBJECTIVE HAVING A FOCUSING CONTROL WITH PREVENTION OF CHANGE IN ANGULAR FIELD OF VIEW

[75] Inventor: Kazuo Tanaka, Tokyo, Japan

[73] Assignee: Canon Kabushiki Kaisha, Tokyo, Japan

[21] Appl. No.: 21,684

[22] Filed: Mar. 19, 1979

[30] Foreign Application Priority Data

Mar. 23, 1978 [JP] Japan .................................. 53-33475

[51] Int. Cl.³ ............................................. G02B 15/14
[52] U.S. Cl. ................................................. 350/427
[58] Field of Search ......................... 350/184, 186, 427

[56] References Cited

U.S. PATENT DOCUMENTS 3,632,188   1/1972   Nakamura ............................. 350/186
4,124,274  11/1978   Tanaka et al. ........................ 350/184

Primary Examiner—John K. Corbin
Assistant Examiner—Scott J. Sugarman

[57] ABSTRACT

An optical system comprising, from front to rear, a first lens group movable for focusing, a second lens group movable for focusing and a third lens group stationary during focusing, whereby change in angular field of view of the photographic objective is prevented from occurring during focusing by controlling axial movement of the aforesaid first and second lens groups in a predetermined relation so as not to change in position the rear principal point of the entire lens system.

1 Claim, 5 Drawing Figures

PHOTOGRAPHIC OBJECTIVE HAVING A FOCUSING CONTROL WITH PREVENTION OF CHANGE IN ANGULAR FIELD OF VIEW

BACKGROUND OF THE INVENTION

This invention relates to a photographic objective provided with a mechanism for preventing changes in angular field of view during focusing, and more particularly to such mechanism for a zoom lens.

As one form of provision for focusing, it is known to axially move the front part of a lens system which is arranged on the object side. Particularly in the case of the zoom lens, since the image shift is prevented from occurring with zooming by always giving an object point (an image point of the focusing lens) at a fixed position relative to the zooming lens groups such as variator independently of the object distance, the provision for focusing is generally made not in the entire lens system but at a front lens group (focusing lens). Also for long focal length objectives, it has been proposed to focus by moving of the front lens group for the purpose of avoiding an increase in size and weight of the lens mounting which would be otherwise caused when the entire system is moved to effect focusing.

In this front lens group dependent focusing method, for purposes of minimizing the diameter of the front lens member and of shortening the object distance, it is known to divide the front lens group into two parts which are moved relative to each other during focusing. This type focusing mechanism is disclosed in U.S. Pat. No. 3,632,188 where negative and positive lens subgroups are moved in the same direction by different amounts during focusing, Japanese patent application Laid-Open No. Sho 49-7752 where the focusing lens group is comprised either of two lens subgroups having negative and positive powers, or of a negative, positive and a further negative subgroup, and the front two members are made movable in opposite directions to each other. The technique is also disclosed in U.S. Pat. No. 4,124,274 where the focusing lens group is comprised of a negative, positive and a further positive subgroup, and the front two members are made movable in opposite directions to each other.

In the focusing of lens systems and particularly of zoom lenses, a problem that is particularly desired at present to be solved, is the minimization of variation of angular field of view with focusing.

Conventionally, various proposals have been made to suppress the variation in the angular field of view which occurs during focusing. In Great Britain Pat. No. 975,160 and Japanese patent application Publication No. Sho 42-12103, the front lens group of the zoom lens is constructed with two members of negative and positive powers respectively of which only the frontmost member of negative power is axially movable to effect focusing while achieving minimization in the variation of angular field of view. In U.S. Pat. No. 3,682,534, the front lens group is constructed with two members both of which are of negative power, and the variation of angular field of view is minimized by axially moving the second member from the front while maintaining the first or frontmost member stationary during focusing. Further, in U.S. Pat. No. 4,099,845, of the negative, positive and further positive members constituting the focusing lens group only the second positive member is movable towards the image side. Furthermore, in Japanese patent application Publication No. Sho 53-6051, there is disclosed the fact that the variation in the angular field of view is made nil by moving the two members of the focusing lens group under a certain condition, but the theory for its focusing is conducted with regard only to the front part. Since the remaining lens system that follows the front part is neglected, it would be difficult to utilize this focusing technique in a practical lens system.

SUMMARY OF THE INVENTION

The present invention has for its general object to provide a focusing method which insures that the angular field of view of a lens system does not change when focusing of the lens system is being performed.

The focusing method according to the present invention applied to a focusing control mechanism which maintains the image plane at a fixed position despite variation in object distance is to confine the rear principal point of the entire system to a constant position so that no change in angular field of view is caused to occur during focusing.

In the focusing method according to the present invention, focusing is performed by moving two parts of a lens group in such a manner that one of these two parts contributes mainly to the focusing effect, and the other part in addition to the focusing acts mainly as a means for holding the rear principal point of the entire system at a fixed position. In one embodiment of a photographic objective which will be described later, the part of the focusing lens group which is arranged on the object side acts mainly for focusing purposes, and the focusing lens part arranged on the image side acts mainly to fix the position of the rear principal point of the entire system.

A lens system employing the focusing method of the invention may be constructed with, from front to rear, a first lens group movable for focusing, a second lens group movable for focusing and a third lens group stationary during focusing and is characterized by fulfilling the following relationship between the amount, $x_1$, of axial movement of the first lens group and the amount, $x_2$, of axial movement of the second lens group to effect no change in angular field of view at all throughout the entire range of focusing:

$$x_2 = x_1 - e'_{1\infty} + \frac{1}{\psi_1} + \frac{B^* - D^* \Delta'_\infty}{A^* - C^* \Delta'_\infty} - \frac{1}{\psi_1(A^* - C^* \Delta'_\infty)}$$

where
  $A^* = -\Psi_2 e'_2 + 1$
  $B^* = e'_2$
  $C^* = -\Psi_2\Psi_3 e'_2 + \Psi_2 + \Psi_3$
  $D^* = -\Psi_3 e'_2 + 1$
  $e'_2 = e'_{2\infty} - x_2$ $e'_{1\infty}$: the interval between the principal points of the first and second lens groups set when the optical system is focused at infinity;

$e'_{2\infty}$: the interval between the principal points of the second and third lens groups set when the optical system is focused at infinity;

$\Psi_i$: the power of the i-th lens group;

$\Delta'_\infty$: the distance from the rear principal point of the third lens group to the rear principal point of the entire optical system when focused at infinity.

This equation is obtained for the lens system which essentially comprises three lens groups of which the first two are movable for focusing in front of the third lens group which is stationary during focusing. In applying the equation to a zoom lens including a fixed lens group (so-called relay lens) on the image side of the zoom lens group which is stationary during focusing, therefore, the relay lens must be considered to constitute part of the third lens group. Also in case where an additional fixed lens group is included in a space between the focusing lens group and the zoom lens group, it is of course certain that the aforesaid fixed lens group is included in the third lens group.

DESCRIPTION OF THE PREFERRED EMBODIMENTS

Figure 1:
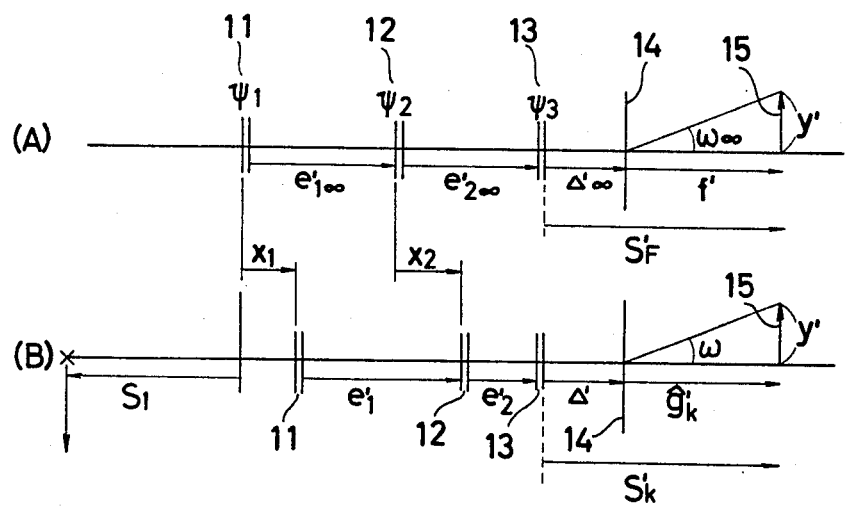
FIGS. 1(A) and 1(B) show diagramatically the principles of the focusing method of the invention.

FIGS. 1(A) and (B) show diagrammatically and graphically illustrate the effect on angular field of view in the image space when a lens system is focused on an object at infinity and on an object at a distance, $S_1$, respectively. This lens system comprises first and second lens groups 11 and 12 movable for focusing and a third lens group 13 stationary during focusing, and forms an image of an object at a focal plane 15. The rear principal plane of the entire system is indicated at 14. The reference, y, designates a maximum image height. Where the lens system is focused on the infinitely distant object, $e'i\infty$ designates the interval between the principal points of the i-th and (i+1)th lens groups, $\Delta'\infty$ the interval between the rear principal plane of the third lens group 13 and the rear principal plane 14 of the entire system, f' the focal length, S'F the back focal length, and $\omega\infty$ the angular field of view. Where the lens system is focused on the object at the finite distance $S_1$, $e'i$ designates the interval between the principal points of the i-th and (i+1)th lens groups, $\Delta'$ the interval between the rear principal plane of the third lens group 13 and the rear principal plane 14 of the entire lens system, $\hat{g}'k$ the interval between the aforesaid principal plane 14 and the image plane 15, S'k the lens back, and $\omega$ the angular field of view. When the lens system is focused down from the reference position of FIG. 1(A) on the infinitely distant object to the finite object distance $S_1$, the first lens group 11 is moved toward the image plane 15 by a distance, $x_1$, and the second lens group 12 is concurrently moved toward the image plane 15 by a distance, $x_2$. The angular fields of view $\omega\infty$ for the reference focusing position is given by $$\omega\infty = y'/f'$$

The angular field of view $\omega$ for a focusing position for a finite object distance is given by $$\omega = y'/\hat{g}'k$$

Though these angular fields of view are considered in the image space, since they are referred to the principal point, the angular field of view in the object space is equal to that in the image space.

If the angular field of view for the reference and an arbitrary focusing positions are equal to each other, then $$f' = \hat{g}'k$$

$$f' = S'k - \Delta' \tag{1}$$

In order that objects at all distances remain in focus, the following equation must be satisfied:

$$S'F = S'k \tag{2}$$

From (1) and (2), we have $$f' = S'F - \Delta \tag{3}$$

Using $$S'F - f = \Delta'\infty \tag{4}$$

we obtain $$\Delta'\infty = \Delta' \tag{5}$$

The equation (5) provides a condition that no variation of the angular field of view is caused to occur when focusing is being performed. In terms of the power $\Psi i$ of the i-th lens group and the amounts of movement of the first and second lens groups 11 and 12, the equation (5) may be alternately expressed as:

$$A - C\Delta'\infty - 1 = 0 \tag{6}$$

where $$A = \Psi_1\Psi_2 e'_1 e'_2 - \Psi_1 e'_1 - \Psi_1 e'_2 - \Psi_2 e'_2 + 1$$

$$C = \Psi_1\Psi_2\Psi_3 e'_1 e'_2 - \Psi_1\Psi_2 e'_1 - \Psi_1\Psi_2 e'_2 - \Psi_1\Psi_3 e'_1 - \Psi_1\Psi_3 e'_2 + \Psi_1 + \Psi_2 + \Psi_3$$

$$e'_1 = e'_1\infty - x_1 + x_2$$

$$e'_2 = e'_2\infty - x_2$$

By solving the equation (6) for the amount $x_1$ of movement of the first lens group 11, we find $$x_1 = e'_1\infty + x_2 - \frac{1}{\Psi_1} - \frac{B^* - D^*\Delta'\infty}{A^* - C^*\Delta'\infty} + \frac{1}{\Psi_1(A^* - C^*\Delta'\infty)} \tag{7}$$

where $$A^* = -\Psi_2 e'_2 + 1$$

$$B^* = -e'_2$$

$$C^* = -\Psi_2\Psi_3 e'_2 + \Psi_2 + \Psi_3$$

$$D^* = -\Psi_3 e'_2 + 1$$

$$e'_2 = e'_2\infty - X_2$$

Thus, no variation of the angular field of view can be effected at all by moving the first and second lens groups in accordance with the equation (7).

Figure 2:
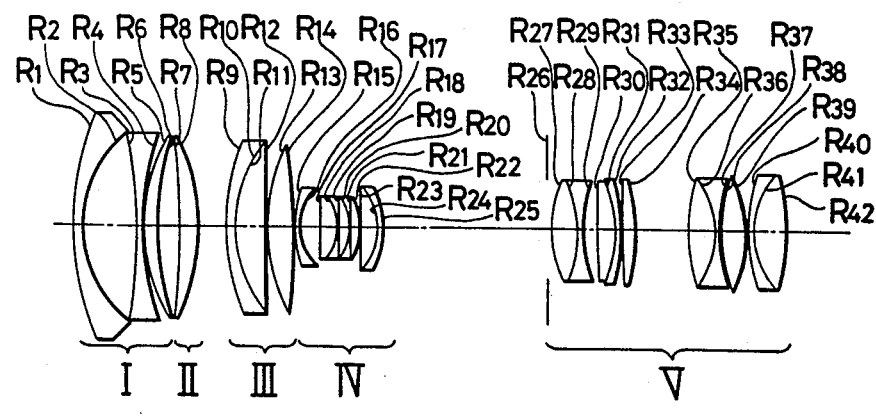
FIG. 2 is a block diagram of one embodiment of a lens system employing the focusing method according to the present invention.
Figure 3:
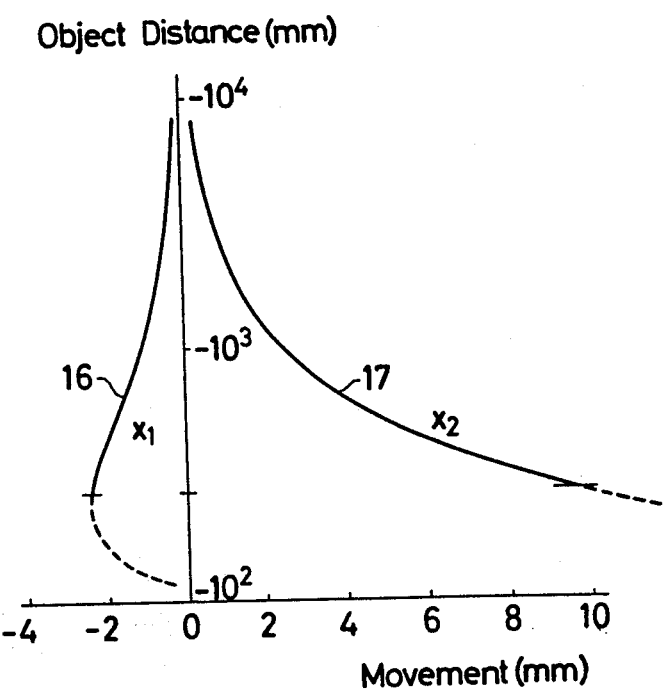
FIG. 3 is a graph showing a relationship in which the first and second lens groups of FIG. 2 are moved for focusing.

A specific example of a zoom lens employing the focusing method of the invention is shown in FIG. 2, comprising a first focusing lens group I with refracting surfaces $R_1$ to $R_6$ movable in unison during focusing, a second focusing lens group II with refracting surfaces $R_7$ and $R_8$ movable in different manner to that in which the aforesaid first lens group I is moved, a fixed lens group III with refracting surfaces $R_9$ to $R_{13}$ stationary during focusing and also during zooming, a varifocal lens group IV with refracting surfaces $R_{14}$ to $R_{25}$ movable during zooming, a diaphragm $R_{26}$, and an always fixed relay lens group V with refracting surfaces $R_{27}$ to $R_{42}$. FIG. 3 shows how the first and second lens group of the zoom lens system of FIG. 2 move with variation of the object distance when set in the shortest focal length position (wide angle setting), where the ordinate is object distance, and the abscissa is the amount of movement. In FIG. 3, 16 is a curve illustrating variation with object distance of the amount $x_1$ of movement of the first focusing lens group I, and 17 is a curve illustrating variation with object distance of the amount, $x_2$, of movement of the second focusing lens group II. As they move toward the object, $x_1$ and $x_2$ are negative, and as they move toward the image plane, the values are positive. The position where the $x_1$ and $x_2$ are zero, that is, reference position, corresponds to the focusing of the first and second lens groups I and II at infinity in the wide angle setting. And, the object distance is measured from the front principal point of the first focusing lens group I to the object. Since the object is placed to the left of the aforesaid front principal point, the object distance is negative. The angular field of view of this lens system in the wide angle setting is 35.9°. This zoom lens system can be constructed in accordance with the numerical data given in the following table where r is the radii of curvature of the refracting surfaces; d is the axial thicknesses and air separations between the successive surfaces; V is the dispersive indices for the various lens elements; and N is the indices of refraction of the lens elements.

| Surface No | f = 11.045 − 86.154 Field Angle = 35.9° | | | |
|---|---|---|---|---|
| | r | d | V | N |
| R 1 | 108.33298 | 2.20000 | 55.5 | 1.70 |
| R 2 | 39.88813 | 18.58761 | | |
| R 3 | −133.93909 | 2.20000 | 60.1 | 1.64 |
| R 4 | 164.06383 | 0.20000 | | |
| R 5 | 63.58064 | 5.42088 | 27.5 | 1.76 |
| R 6 | 119.05223 | 6.93229 | | |
| R 7 | −256.14867 | 6.05204 | 60.1 | 1.64 |
| R 8 | −71.71888 | 9.98259 | | |
| R 9 | 91.28432 | 2.00000 | 23.9 | 1.85 |
| R 10 | 44.16668 | 0.29994 | | |
| R 11 | 45.30824 | 10.69966 | 60.1 | 1.64 |
| R 12 | 10744.54070 | 0.20000 | | |
| R 13 | 61.84505 | 8.20348 | 60.1 | 1.64 |
| R 14 | −341.46622 | $D_1$* | | |
| R 15 | 49.10500 | 1.00000 | 49.6 | 1.77 |
| R 16 | 18.10000 | 6.73000 | | |
| R 17 | −95.89700 | 5.00000 | 51.0 | 1.51 |
| R 18 | −15.39300 | 0.80000 | 49.6 | 1.77 |
| R 19 | 107.35000 | 3.29800 | | |
| R 20 | −18.39400 | 0.80000 | 55.5 | 1.70 |
| R 21 | 171.64000 | 2.74000 | 21.3 | 1.92 |
| R 22 | −42.33300 | $D_2$* | | |
| R 23 | −205.29000 | 5.80000 | 63.1 | 1.57 |
| R 24 | −20.11600 | 1.30000 | 25.4 | 1.81 |
| R 25 | −26.74900 | $D_3$* | | |
| R 26 | 0.00000 | 1.20000 | | |
| R 27 | 39.93100 | 8.64000 | 34.5 | 1.64 |
| R 28 | −46.85100 | 1.40000 | 49.6 | 1.77 |
| R 29 | 47.16000 | 5.30000 | | |
| R 30 | 309.49800 | 6.54000 | 70.1 | 1.49 |
| R 31 | −38.22340 | 1.40000 | 40.9 | 1.81 |
| R 32 | −79.46500 | 0.29000 | | |
| R 33 | 432.87000 | 4.43000 | 64.1 | 1.52 |
| R 34 | −89.33900 | 18.40000 | | |
| R 35 | 92.89800 | 8.80000 | 70.1 | 1.49 |
| R 36 | −31.67600 | 1.50000 | 40.9 | 1.81 |
| R 37 | 79.13700 | 0.30000 | | |
| R 38 | 57.14500 | 8.69000 | 64.1 | 1.52 |
| R 39 | −46.05300 | 0.20000 | | |
| R 40 | 56.22400 | 1.40000 | 49.6 | 1.77 |
| R 41 | 26.28700 | 10.76000 | 64.1 | 1.52 |
| R 42 | −87.85600 | 6.00000 | | |

| Lens Separation during Zooming with Object at Infinity | | |
|---|---|---|
| | f = 11.045 | f = 86.154 |
| $D_1$* | 0.92779 | 54.7708 |
| $D_2$* | 0.62761 | 0.5218 |
| $D_3$* | 54.9373 | 1.2002 |

Figure 4:
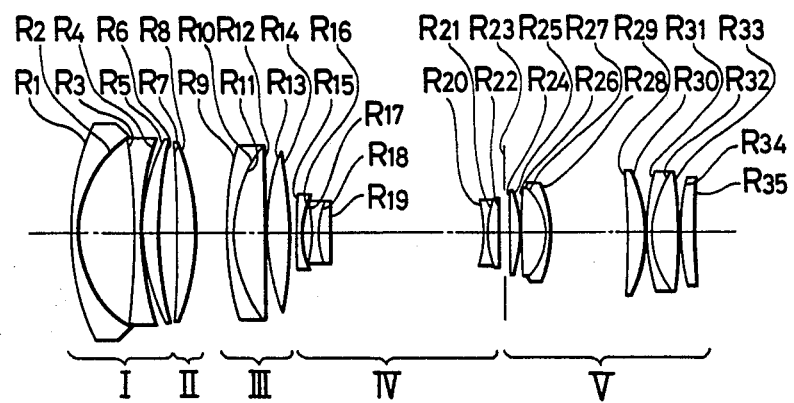
FIG. 4 is a block diagram of another embodiment of a lens system employing the focusing method according to the present invention.
Figure 5:
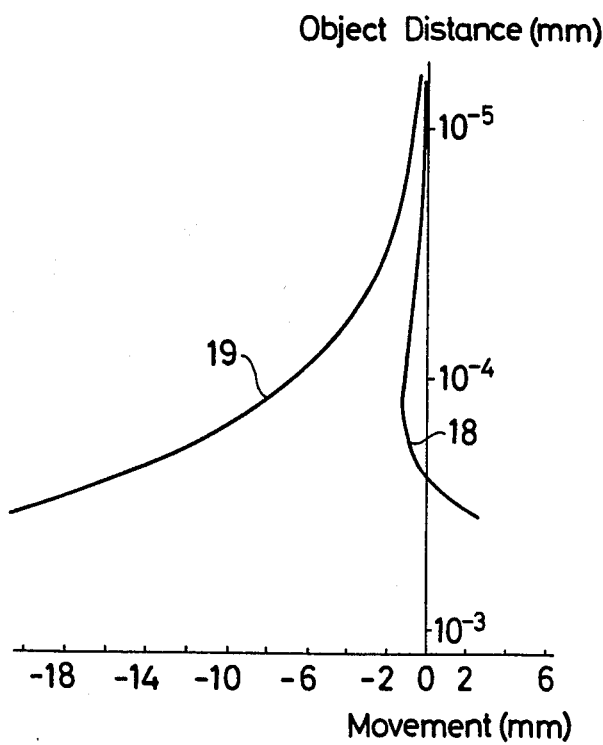
FIG. 5 is a graph showing a relationship in which the first and second lens groups of FIG. 4 are moved for focusing.

The values of the parameters in the equation (7) for the aforesaid surfaces $R_1$ to $R_6$ constituting the first lens group 11, the surfaces $R_7$ and $R_8$ constituting the second lens group 12 and the surfaces $R_9$ to $R_{42}$ constituting the third lens group 13 when focused at infinity in the wide angle setting are:

$\Psi_1 = -0.017066$, $\Psi_2 = 0.0065074$, $\Psi_3 = 0.0470539$,
$e'_{1\infty} = 26.3156$, $e'_{2\infty} = 79.1646$ FIG. 4 shows another embodiment of a focusing method according to the present invention applied to a zoom lens with the individual lens groups I, II, III, IV and V having the same functions as those of the lens groups shown in FIG. 2. The first focusing lens group I has surfaces $R_1$ to $R_6$; the second focusing lens group II has surfaces $R_7$ and $R_8$; the fixed lens group III has surfaces $R_9$ to $R_{13}$; the varifocal lens group IV has surfaces $R_{14}$ to $R_{22}$; the diaphragm is $R_{23}$; and the fixed relay lens V has surfaces $R_{24}$ to $R_{35}$. In the shortest focal length position (wide angle setting) of the zoom lens shown in FIG. 4, the angular field of view is maintained unchanged during focusing provided that the first and second focusing lens groups I and II are moved in a relation shown in FIG. 5 where 18 and 19 are curves illustrating variations with object distance of the amounts of movement of the first and second focusing lens groups I and II respectively. It is to be noted here that the direction of movement of the second focusing lens group II is reversed as compared with the foregoing embodiment. For this reason, while the lens system of FIG. 2 can be focused down to an object distance of 30 cm, the lens system shown in FIG. 4 can not be focused down to shorter object distances than 8 meters, as mechanical interference between the adjacent lens groups must be avoided. The lens system of FIG. 4 can be constructed in accordance with the numerical data given in the following table where the various symbols have the meaning previously described in the disclosure.

| Surface No. | f = 8.492 − 83.377 | | | |
|---|---|---|---|---|
| | r | d | V | N |
| R 1 | 89.25948 | 2.20000 | 55.5 | 1.70 |
| R 2 | 37.73167 | 18.58761 | | 1. |
| R 3 | −280.89411 | 2.20000 | 60.1 | 1.64 |
| R 4 | 96.30269 | 0.20000 | | 1. |
| R 5 | 62.74863 | 5.42088 | 27.5 | 1.76 |
| R 6 | 114.97174 | 6.93229 | | 1. |
| R 7 | −553.02689 | 6.05204 | 60.1 | 1.64 |

-continued

| | | | | |
|---|---|---|---|---|
| R 8 | −76.27086 | 9.98259 | | 1. |
| R 9 | 107.68714 | 2.00000 | 23.9 | 1.85 |
| R 10 | 46.13430 | 0.29994 | | 1. |
| R 11 | 47.39395 | 10.69966 | 60.1 | 1.64 |
| R 12 | 1428.24032 | 0.20000 | | 1. |
| R 13 | 73.81803 | 8.20348 | 60.1 | 1.64 |
| R 14 | −141.77073 | $D_1^*$ | | 1. |
| R 15 | 162.69035 | 1.20000 | 46.6 | 1.82 |
| R 16 | 26.88685 | 4.00000 | | 1. |
| R 17 | −31.08280 | 1.52000 | 46.6 | 1.82 |
| R 18 | 23.70423 | 4.00000 | 21.3 | 1.92 |
| R 19 | 138.46255 | $D_2^*$ | | 1. |
| R 20 | −34.59280 | 1.00000 | 40.9 | 1.81 |
| R 21 | 29.19656 | 4.02000 | 25.4 | 1.81 |
| R 22 | −402.54309 | $D_3^*$ | | 1. |
| R 23 | 0.00000 | 1.93539 | | 1. |
| R 24 | −471.43668 | 3.72034 | 27.5 | 1.76 |
| R 25 | −48.24355 | 0.20000 | | 1. |
| R 26 | 672.23540 | 8.59918 | 70.1 | 1.49 |
| R 27 | −19.86115 | 1.60000 | 37.2 | 1.83 |
| R 28 | −41.03616 | 26.18967 | | 1. |
| R 29 | −315.04592 | 6.70559 | 60.7 | 1.60 |
| R 30 | −44.49483 | 0.20000 | | 1. |
| R 31 | 77.87520 | 2.00000 | 25.4 | 1.80 |
| R 32 | 32.31798 | 9.49270 | 70.1 | 1.49 |
| R 33 | −136.69257 | 0.20000 | | 1. |
| R 34 | 68.48806 | 4.84732 | 70.1 | 1.49 |
| R 35 | 294.5460 | 5.00000 | | 1. |

| Lens Separation during Zooming with Object at Infinity | | |
|---|---|---|
| | f = 8.492 | f = 83.377 |
| $D_1^*$ | 1.80320 | 50.9916 |
| $D_2^*$ | 52.18879 | 3.0181 |
| $D_3^*$ | 1.77543 | 1.7577 |

The values of the parameters in the equation (7) for the first lens group of the surfaces $R_1$ to $R_6$, the second lens group of surfaces $R_7$ and $R_8$ and the third lens group of the surfaces $R_9$ to $R_{35}$ when focused at infinity in the wide angle setting are:

$\Psi_1 = 0.0147018$, $\Psi_2 = 0.0072697$, $\Psi_3 = 0.0717463$, $e'_{1\infty} = 26.631$, $e'_{2\infty} = 68.414$

What is claimed is:

1. A photographic objective having focusing means with prevention of change in angular field of view comprising:
   a first lens group arranged in a frontmost object space and movable for focusing;
   a second lens group arranged on the image side of said first lens group and movable for focusing, wherein the amount of the movement $x_2$ of said second len group for focusing being in accompaniment with the amount of the movement $x_1$ of said first lens group, the amount of movement $x_2$ being almost equal to:

$$x_2 = x_1 - e'_{1\infty} + \frac{1}{\psi_1} + \frac{B^* - D^* \Delta'_\infty}{A^* - C^* \Delta'_\infty} - \frac{1}{\psi_1 (A^* - C^* \Delta'_\infty)}$$

where $A^* = -\Psi_2 e'_2 + 1$ $B^* = -e'_2$ $C^* = -\Psi_2 \Psi_3 e'_2 + \Psi_2 + \Psi_3$ $D^* = -\Psi_3 e'_2 + 1$ $e'_2 = e'_{2\infty} - x_2$ $e'_{1\infty}$: the interval between the principal points of the first and second lens groups in a state where the optical system is focused at infinity;
$e'_{2\infty}$: the interval between the principal points of the second and third lens groups in a state where the optical system is focused at infinity;
$\Psi_i$: the power of the i-th lens group;
$\Delta'_\infty$: the distance from the rear principal point of the third lens group to the rear principal point of the entire optical system in a state where the system is focused at infinity; and
a third lens group arranged on the image side of said second group and stationary during focusing.

* * * * *